Aug. 18, 1925.
F. S. MARCELLUS
AMPERE HOUR METER
Filed Oct. 9, 1923
1,550,179
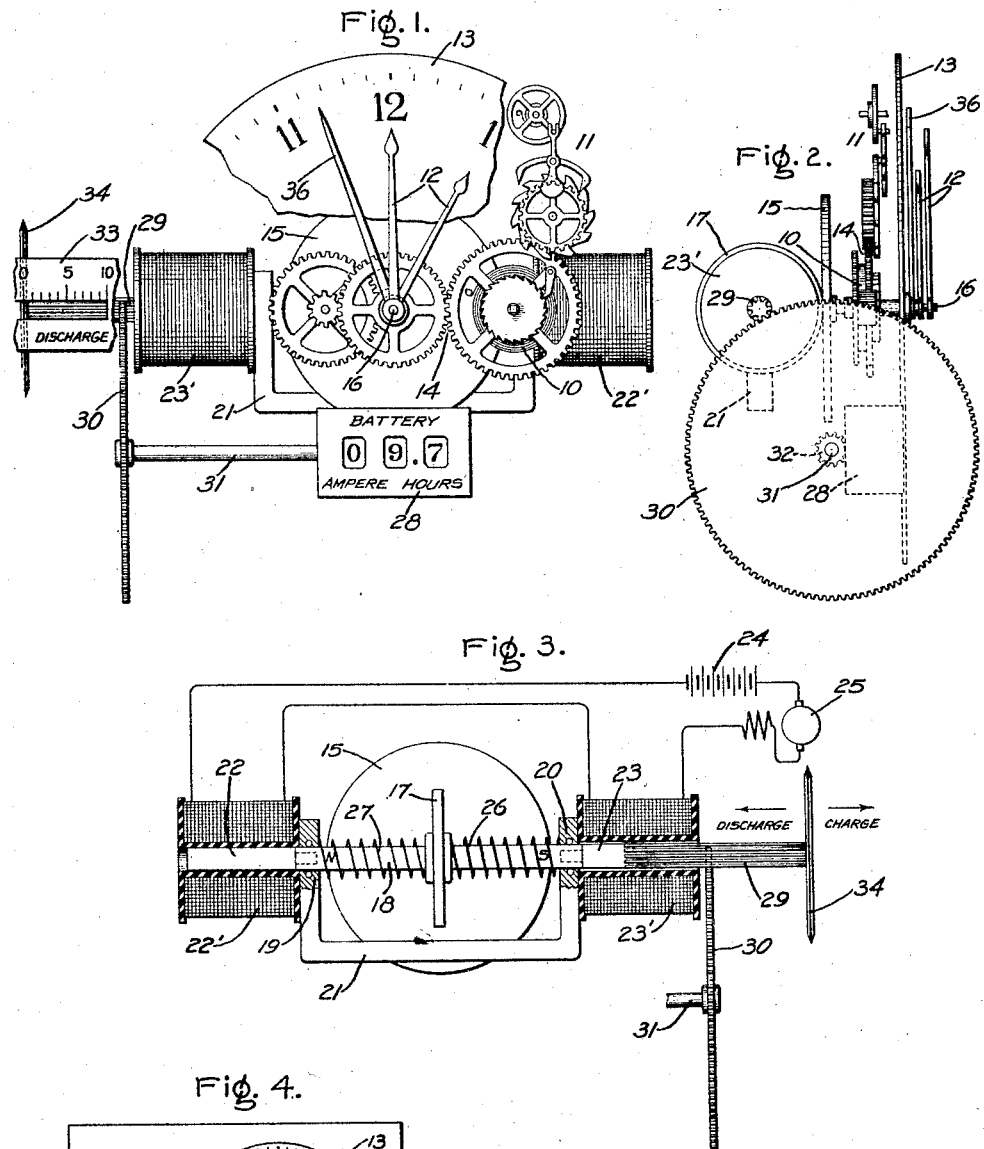
Inventor.
Fredrick S. Marcellus,
by
His Attorney.

Patented Aug. 18, 1925.

1,550,179

UNITED STATES PATENT OFFICE.

FREDRICK S. MARCELLUS, OF AMSTERDAM, NEW YORK, ASSIGNOR TO GENERAL ELECTRIC COMPANY, A CORPORATION OF NEW YORK.

AMPERE-HOUR METER.

Application filed October 9, 1923. Serial No. 667,576.

*To all whom it may concern:*

Be it known that I, FREDRICK S. MARCELLUS, a citizen of the United States, residing at Amsterdam, in the county of Montgomery, State of New York, have invented certain new and useful Improvements in Ampere-Hour Meters, of which the following is a specification.

My invention relates to electric measuring instruments and in particular to a measuring instrument to indicate the current and the condition of charge of a storage battery.

My invention is preferably combined with a clock movement and is thus particularly adapted for use on the dash-board of automobiles to indicate the time of day and the condition of the automobile storage battery. It is important in any storage battery installation to be able to ascertain at a glance the condition of the battery, for example, the number of ampere hours remaining available in the battery and whether the battery is being charged or discharged and its rate in order that the proper measures may be taken to charge the battery when it becomes nearly discharged, to protect it against overcharge, to control the charging current and to be assured that the charge is sufficient in any case to accomplish the work at hand.

It is the primary object of my invention to provide a simple, convenient and economical instrument for this purpose. A further object of my invention is to cause an indicating clock to operate a portion of the integrating mechanism of the instrument so arranged that the time of day, the condition of the battery and the magnitude and direction of the battery current may be indicated by the combined instrument. It is convenient to associate the clock with the instrument in order that the length of time during which the battery is being charged or discharged in any case may be readily ascertained.

The features of my invention which I believe to be novel and patentable will be pointed out in the claims appended hereto. For a better understanding of my invention, reference is made in the following description to the accompanying drawing in which Fig. 1 represents a partial face view of the preferred form of my invention; Fig. 2, an end view of Fig. 1; Fig. 3, a partial rear view of Fig. 1, and Fig. 4 a face view of the combined instrument to illustrate its appearance when applied to the instrument board of an automobile.

Referring to the drawings, in Figs. 1 and 2, I have represented a standard form of clock movement comprising a driving spring 10, an escapement mechanism 11, clock hands 12, a clock dial 13, and suitable connecting gearing represented in general by the numeral 14. The details of construction of the clock mechanism and the particular form of clock used constitutes no part of my invention and further explanation thereof is deemed unnecessary.

At the rear of the clock works a disc 15 is provided which disc is rotated by the clockwork at a constant speed, for example, by the minute hand shaft 16. Adjacent disc 15 and lightly bearing thereon is a smaller disc 17 having its plane at right angles to the disc 15. The disc 17 is shown somewhat larger in diameter than is necessary, this for the sake of clearness. Disc 17 is mounted on a shaft 18 (see Fig. 3) which shaft constitutes a permanent magnet having north and south poles at its opposite ends and is rotatably mounted in suitable bearings 19 and 20 in a stationary framework 21 made of non-magnetic material such as brass. The shaft 18 is mounted so that it may readily be slid endwise through the bearings 19 and 20 at the same time it is being rotated and is biased by springs 26 and 27 so that the disc 17 normally stands at the center of disc 15 in which position there is no rotation of disc 17, or of the shaft 18. Shaft 18 is provided with extensions 22 and 23 made of non-magnetic material such as brass and the parts thereof adjacent the bearings are accurately turned to provide a bearing surface so as to allow the shaft 18 to rotate freely when it is moved endwise in either direction from the central position illustrated.

It will now be evident that when shaft 18 and the disc 17 are moved to the right of the central position shown, the disc 15 will cause their rotation in one direction at a speed dependent upon the distance moved from the center of disc 15 and similarly, when moved to the left of the central position, these parts will rotate in the opposite direction.

I provide means, dependent upon the direction and magnitude of the quantity to be measured, in the present illustration, the battery current, to move the disc 17 relative to the disc 15 whereby the direction and speed of rotation of the shaft 18 is made dependent upon the direction and magnitude of the battery current. Surrounding the extensions of the shaft 18 are two solenoids 22′ and 23′ connected in series and wound so as to have opposing effects upon the permanent magnet shaft 18. Part or all of the current flowing to or from the battery represented at 24 is caused to flow through the solenoids 22′ and 23′. As represented, a dynamo electric machine 25, which may serve either as a motor or a generator, is connected in series with the battery and the solenoids.

Now, let us assume that the machine 25 is operating as a generator and charging the battery 24. The direction of current flow through the solenoid 22′ is such as to cause a north pole field to be produced adjacent the north pole end of the shaft 18, thereby repelling the shaft lengthwise, while the end of the solenoid 23′ adjacent the south pole end of shaft 18 produces a north pole field which attracts the adjacent south pole and the shaft. As a result, the shaft 18 is moved to the right in Fig. 3 against the action of spring 26 and the extent of such movement will be proportional to the value of the charging current. When the battery 24 is discharging and driving machine 25 as a motor, the polarities of the two solenoids 22′ and 23′ will be reversed moving shaft 18 in the reverse direction. Consequently, the speed of rotation of shaft 18 will be dependent upon the strength of the battery current and the direction of rotation thereof dependent upon whether the battery is discharging or being charged. When no current is flowing in the battery circuit, the springs 26 and 27 bring the disc 17 back to the central position.

By registering the aggregate rotations of shaft 18, the state of charge or discharge of the battery 24 may be indicated. For this purpose I have illustrated a reversible cyclometer type counter 28, which may be calibrated to read ampere hours, arranged to be driven from shaft 18. The extension 23 of shaft 18 is provided with gear teeth 29 extending for a considerable length thereof, which gear teeth mesh with and drive a gear 30 mounted on the shaft 31 which drives the cyclometer gearing 32. Of course, the cyclometer gear 32 might be driven directly from shaft 18. However, I prefer the arrangement above described since then I may set the face of the cyclometer 28 flush with the lower central portion of the face of the clock dial 13 as indicated in Figs. 1 and 2, somewhat in the manner as the second hand dial of the ordinary watch is positioned with respect to the watch dial, thus making a compact and neat arrangement.

If the device is to be used for indicating the condition of a storage battery, allowance must be made for the fact that the efficiency of a storage battery is somewhat below 100 per cent; that is to say, if it requires 20 ampere hours to fully charge the battery, something less, for example, only 18 ampere hours, can be obtained by completely discharging the same. In order to compensate for this difference in the charging and discharging currents of the battery, the spring 26 may be made enough stronger than the spring 27 to make the aggregate rotation of the shaft 18 equal to zero for a complete cycle or charge and discharge of the battery. Then, if the cyclometer reads zero when the battery is completely discharged, it will read a maximum when the battery is fully charged and it will remain in this condition for subsequent charges and discharges and will always indicate the true ampere hour charge remaining in the battery.

It will be observed that so far as the endwise movement of the shaft 18 is concerned, the instrument is a form of an indicating type ammeter which not only has a movement proportional to the strength of the current, but also indicative of its direction. Practically all automobile dash-boards are equipped with an instrument for such purposes and it is only necessary to provide my instrument with a suitable scale lengthwise of the shaft and a suitable indicator on the shaft to indicate the direction and strength of the battery current. 33 indicates such a scale and 34 an indicator which constitutes a thin edged disc mounted on the end of the extension 29 of shaft 18. The disc 34 has been omitted from Fig. 2 in order that the remaining parts may be more clearly illustrated. The disc 34 is preferably of sufficient diameter so that it will come up close behind the scale 33 when the latter is mounted in a plane with the clock dial.

If desired, the clock may be provided with an auxiliary pointer 36 driven by, but adjustable with respect to, either the hour or minute hand shaft in order that this auxiliary pointer may be set opposite 12 o'clock on the clock dial when the battery charging is started. In this way a more convenient timing of the charging period of the battery is provided than with the ordinary clock hands since the operator is no longer required to remember when he started to charge the battery. This auxiliary pointer will be found convenient for timing other operations, such for example, as the duration of time spent during a certain automobile trip. When the auxiliary pointer 36 is not in use, it may be released from the driving mechanism in a manner similar to the release of the pointer of a stop watch.

A clock and an indicating ammeter are considered to be standard attachments for the better class of automobiles and an ampere hour meter for indicating the condition of the battery is also found on some automobiles; however, so far as I am aware, these instruments have always been made separate and as so made, take up considerable space on the instrument board of the automobile. With my invention, I combine these three instruments in one at a cost which is considerably less than that of three separate instruments used for the same purposes. Rugged construction and reliability have not been sacrificed, however. The general appearance of the combined instrument is neat and the required space considerably less than if three separate instruments were provided as will be evident from an inspection of Fig. 4 which illustrates the face view of my combined instrument.

While my invention is particularly suitable for automobile purposes and for storage battery measurements, I do not wish to limit my invention to these uses nor to the exact arrangement of the parts shown and described, but seek to cover in certain of the appended claims all modifications and uses coming fairly within the true spirit and scope of my invention.

What I claim as new and desire to secure by Letters Patent of the United States, is:—

1. An instrument for indicating the condition of storage batteries comprising a constant speed motor, means for measuring the direction and magnitude of the battery current, said means being compensated for the difference between the charging and discharging energy of the battery and means driven by said motor and controlled by said measuring means for registering the condition of the battery in terms of ampere hours charge.

2. An instrument for integrating an electric current which is subject to variations both in direction and magnitude comprising a polarized shaft, a pair of series connected coils adjacent the opposite ends of said shaft for moving said shaft from a central position in a direction and amount dependent upon the direction and amount of the current to be measured, means for returning said shaft to a central position, means for rotating said shaft in a direction and at a speed dependent upon the direction and magnitude of the electric current to be measured, and means for registering the aggregate rotations of said shaft.

3. An instrument for integrating an electric current which is subject to variations both in direction and magnitude comprising a polarized shaft provided with non-magnetic extensions on the opposite ends thereof, a pair of series connected coils surrounding said extensions for moving said shaft from a central position in a direction and amount dependent upon the direction and amount of the current to be measured, means for returning said shaft to said central position, a constant speed motor arranged to rotate said shaft in a direction and at a speed dependent upon the direction and distance moved from said central position, and means for registering the aggregate rotations of said shaft.

In witness whereof, I have hereunto set my hand this 8th day of October 1923.

FREDRICK S. MARCELLUS.